United States Patent
Uno et al.

(10) Patent No.: US 10,518,630 B2
(45) Date of Patent: Dec. 31, 2019

(54) VEHICLE

(71) Applicant: Yamaha Hatsudoki Kabushiki Kaisha, Shizuoka-ken (JP)

(72) Inventors: Ryotaro Uno, Shizuoka (JP); Masahide Shimbori, Shizuoka (JP)

(73) Assignee: Yamaha Hatsudoki Kabushiki Kaisha, Shizouka-ken (JP)

( * ) Notice: Subject to any disclaimer, the term of this patent is extended or adjusted under 35 U.S.C. 154(b) by 0 days.

(21) Appl. No.: 16/223,017

(22) Filed: Dec. 17, 2018

(65) Prior Publication Data
US 2019/0193553 A1    Jun. 27, 2019

(30) Foreign Application Priority Data
Dec. 27, 2017 (JP) ................. 2017-251309

(51) Int. Cl.
| B60K 11/04 | (2006.01) |
| B60R 9/06 | (2006.01) |
| F01P 3/18 | (2006.01) |
| B60K 11/08 | (2006.01) |
| B60K 5/00 | (2006.01) |

(52) U.S. Cl.
CPC .............. B60K 11/04 (2013.01); B60K 11/08 (2013.01); B60R 9/06 (2013.01); F01P 3/18 (2013.01); B60K 2005/003 (2013.01); B60Y 2200/124 (2013.01)

(58) Field of Classification Search
CPC .. B60K 11/04; B60K 11/08; B60K 2005/003; F01P 3/18; B60R 9/06; B60Y 2200/124
See application file for complete search history.

(56) References Cited

U.S. PATENT DOCUMENTS

| 3,970,161 A * | 7/1976 | Rowe ................... B60K 11/08 180/68.1 |
| 2006/0213708 A1* | 9/2006 | Witwer .................. F01P 7/10 180/68.1 |
| 2011/0147104 A1* | 6/2011 | Ogawa .................. B60L 50/61 180/65.22 |
| 2016/0102597 A1* | 4/2016 | Jurzok .................. B60K 11/08 123/41.12 |
| 2017/0036717 A1* | 2/2017 | Wakabayashi ......... B60K 13/04 |
| 2017/0087976 A1* | 3/2017 | Tsuchihashi ........... B60K 11/04 |
| 2017/0106745 A1* | 4/2017 | Yamashita ........... B60K 15/063 |
| 2018/0003101 A1* | 1/2018 | Kondou .................. F01P 11/10 |
| 2018/0038074 A1* | 2/2018 | Nishihata ................ F16H 57/04 |
| 2018/0118015 A1* | 5/2018 | Solazzo ................ F28F 19/006 |
| 2018/0178677 A1* | 6/2018 | Swain ..................... B60N 2/01 |

(Continued)

FOREIGN PATENT DOCUMENTS

JP    H02-077385 A    3/1990

*Primary Examiner* — Erez Gurari
(74) *Attorney, Agent, or Firm* — HEA Law PLLC

(57) ABSTRACT

To provide a vehicle that can efficiently cool a radiator even when the radiator is placed in the rear of a seat. The vehicle includes a vehicle body frame, a seat supported by the vehicle body frame, a radiator placed in the rear of the seat and above a seat surface of the seat and including a fan placement surface on which a fan is provided and an air inflow surface opposite to the fan placement surface, the air inflow surface facing at least rearward, and a first outside air guide having a first intake port opening rearward and guiding outside air taken in from the first intake port to the air inflow surface.

22 Claims, 12 Drawing Sheets

(56) References Cited

U.S. PATENT DOCUMENTS

2018/0238022 A1* 8/2018 Kurosaka .................. E02F 9/00
2018/0258831 A1* 9/2018 Seto ........................ B60K 11/04
2018/0266303 A1* 9/2018 Miyamoto ............. B60K 11/02
2018/0370348 A1* 12/2018 Takeuchi ................ B60K 11/08
2019/0047402 A1* 2/2019 Kawakami ............. B60K 11/04

* cited by examiner

VEHICLE

CROSS-REFERENCE TO RELATED APPLICATION

The present application claims priority from Japanese Application JP2017-251309 filed on Dec. 27, 2017, the content of which is hereby incorporated, in its entirety, by reference into this application.

FIELD OF THE INVENTION

The present disclosure relates to a vehicle.

BACKGROUND OF THE INVENTION

Radiators are generally placed in front parts of vehicle bodies for efficient cooling by traveling wind. However, if the radiator is placed in front of a seat, the wind warmed by the radiator flows rearward and a heat insulated structure for protecting a passenger from the warmed wind is required.

Accordingly, as disclosed in JP1990-77385 A, a configuration in which the radiator is placed in the rear of the seat may be employed. According to this configuration, the radiator is placed in the rear of the seat, a wind guide structure is provided on the side of the radiator, a fan is placed in the rear of the radiator, and thereby, the radiator is cooled using the wind from the front of the radiator.

However, when the passenger, seat, or the like is located in front of the radiator, the radiator is not efficiently cooled by the wind from the front.

One objective of this disclosure is to provide a vehicle that can efficiently cool a radiator even when the radiator is placed in the rear of a seat.

SUMMARY OF THE INVENTION

According to a first aspect of the present disclosure, a vehicle comprises a vehicle body frame, a seat supported by the vehicle body frame, a radiator placed in the rear of the seat and above a seat surface of the seat and including a fan placement surface on which a fan is provided and an air inflow surface opposite to the fan placement surface, the air inflow surface facing at least rearward, and a first outside air guide having a first intake port opening rearward and guiding outside air taken in from the first intake port to the air inflow surface. The inventors have found that there is wind flowing from the rear to the front in the rear of the traveling vehicle, particularly, in the rear of the seat. Therefore, according to this aspect of the present disclosure, even when the radiator is placed in the rear of the seat, the outside air may be taken in using the wind flowing from the rear to the front to efficiently cool the radiator.

According to a second aspect of the vehicle, a second outside air guide having a second intake port opening forward and guiding the outside air taken in from the second intake port to the air inflow surface may be further provided. According to this configuration, the radiator may also be cooled using the outside air taken in from the front.

According to a third aspect of the vehicle, the first intake port may be located below the air inflow surface. According to this configuration, the space in the rear of the radiator may be used.

According to a fourth aspect of the vehicle, the first intake port may be located in the rear of the air inflow surface. According to this configuration, the outside air taken in from the rear may be guided directly to the air inflow surface.

According to a fifth aspect of the vehicle, the first intake port may be provided in a rear end part of a vehicle body. According to this configuration, the wind from the rear to the front at a relatively large flow rate can be taken in.

According to a sixth aspect of the vehicle, a luggage carrier placed in the rear of the seat may be further provided, and the first outside air guide may be formed below a luggage mount surface of the luggage carrier. According to this configuration, the wind flowing from the rear to the front may be taken in regardless of the presence of an object, such as luggage.

According to a seventh aspect of the vehicle, a part of the first outside air guide may be formed by the luggage carrier. According to this configuration, the first outside air guide may be formed using the luggage carrier.

According to an eighth aspect of the vehicle, the first intake port may be provided in a rear end part of the luggage carrier. According to this configuration, the wind from the rear to the front at a relatively large flow rate can be taken in.

According to a ninth aspect of the vehicle, a partition wall provided between the first outside air guide and the second outside air guide may be further provided. According to this configuration, a collision between the outside air taken in from the rear and the outside air taken in from the front may be prevented.

According to a tenth aspect of the vehicle, of the air inflow surface, a first area to which the outside air is guided by the first outside air guide may be larger than a second area to which the outside air is guided by the second outside air guide. According to this configuration, the difference between the flow rate at which the outside air taken in from the rear passes through the first area and the flow rate at which the outside air taken in from the front passes through the second area may be suppressed.

According to an eleventh aspect of the vehicle, the seat may include a plurality of seats placed in vehicle width directions side by side, and the second intake port may be located between the plurality of seats in a front view. According to this configuration, the wind from the front to the rear may be efficiently taken in.

According to a twelfth aspect of the vehicle, the air inflow surface may face rearward and upward. According to this configuration, accumulation of foreign matter, such as pebbles, on the air inflow surface may be suppressed.

According to a thirteenth aspect of the vehicle, the radiator may be formed in a plate shape and disposed to be inclined so that the air inflow surface may face rearward and upward and the fan placement surface may face forward and downward. According to this configuration, accumulation of foreign matter such as pebbles on the air inflow surface may be suppressed and the length in the forward and backward directions may be suppressed.

According to a fourteenth aspect of the vehicle, the air inflow surface may extend in vehicle width directions. According to this configuration, the outside air taken in from the rear may be hit to the air inflow surface at an angle closer to the right angle and the length in the forward and backward directions may be suppressed.

According to a fifteenth aspect of the vehicle, a luggage carrier placed in the rear of the seat may be further provided, and the radiator may be placed between the seat and the luggage carrier. According to this configuration, the radiator may be placed using the space between the seat and the luggage carrier.

According to a sixteenth aspect of the vehicle, a cover placed to be opposed to the air inflow surface may be further provided. According to this configuration, the radiator can be protected.

According to a seventeenth aspect of the vehicle, slits may be formed on both sides with a center part of the cover in the vehicle width direction in between. According to this configuration, the radiator may be also cooled by the outside air taken in from the slits.

In an example of the vehicle, an engine placed in the rear of the seat may be further provided, and the fan placement surface may face in a direction of the engine. According to the configuration, the wind emitted from the radiator may be used for cooling of the engine and exhaust pipes etc. connected to the engine.

In an example of the vehicle, a wind shield placed in the front of the seat may be further provided. According to the configuration, even in the case with the wind shield, the outside air may be taken in using the wind from the rear to the front to cool the radiator.

In an example of the vehicle, a wind shield placed in the front of the seat, and a third outside air guide having a third intake port in the front of the wind shield and having an emission port of the outside air taken in from the third intake port in the rear of the wind shield may be further provided. According to the configuration, even in the case with the wind shield, the outside air taken in and emitted by the third outside air guide may be taken in by the second outside air guide.

Further, a front panel that covers a front part of the vehicle body frame and a cover attached onto the front panel may be further provided, and the third outside air guide may be formed by the front panel and the cover. According to the configuration, the third outside air guide may be formed using the front panel and the cover.

Another vehicle proposed in the disclosure includes a vehicle body frame, a seat supported by the vehicle body frame, a radiator placed in the rear of the seat and above a seat surface of the seat and including a fan placement surface on which a fan is provided and an air inflow surface opposite to the fan placement surface, a first outside air guide having a first intake port opening rearward and guiding outside air taken in from the first intake port to the air inflow surface, and a second outside air guide having a second intake port opening forward and guiding the outside air taken in from the second intake port to the air inflow surface. According to the configuration, the radiator may be efficiently cooled by both the outside air taken in from the rear and the outside air taken in from the front.

According to the invention, even when the radiator is placed in the rear of the seat, the radiator can be efficiently cooled.

BRIEF DESCRIPTION OF THE DRAWINGS

The present invention is illustrated by way of example and not limited in the figures of the accompanying drawings in which like references indicate similar elements.

DETAILED DESCRIPTION OF THE INVENTION

Figure 1:
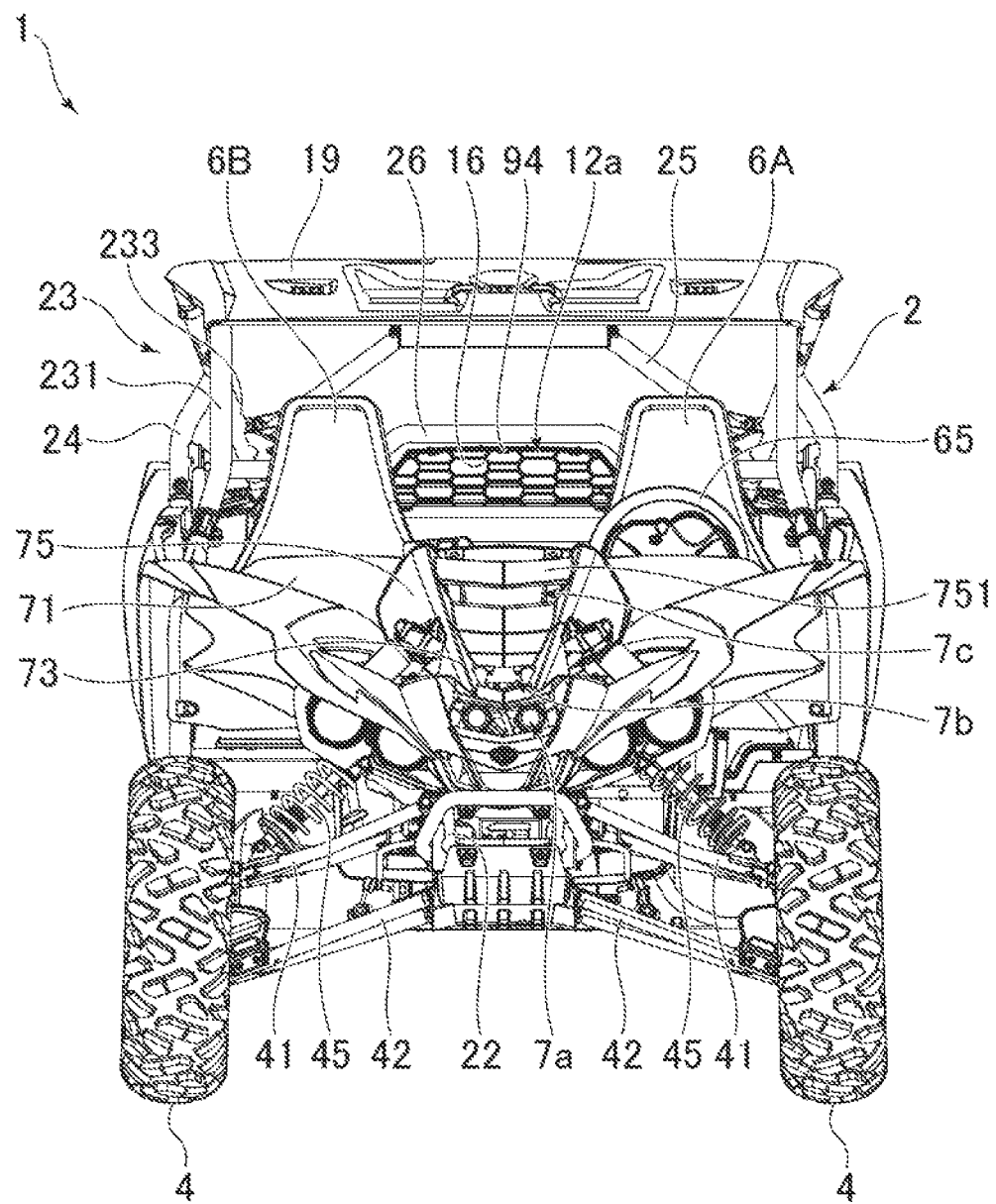
FIG. 1 is a front view of a vehicle according to an embodiment.

An embodiment of the invention will be explained with reference to the drawings. All identically numbered reference characters correspond to each other so that a duplicative description of each reference character in the drawings may be omitted.

Figure 6:
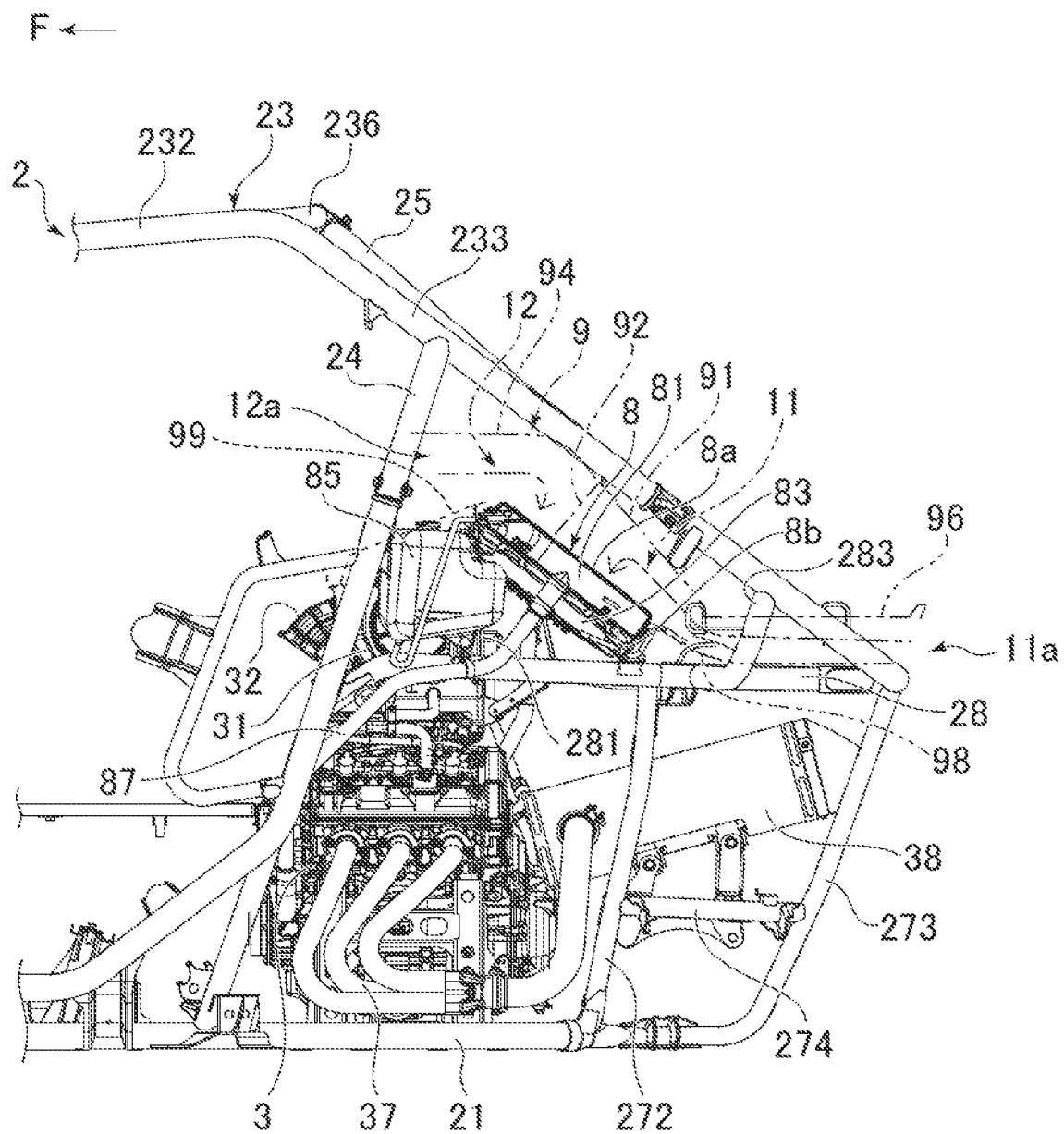
FIG. 6 is a left side view showing a rear part of a vehicle body frame of the vehicle shown in FIG. 1.
Figure 7:
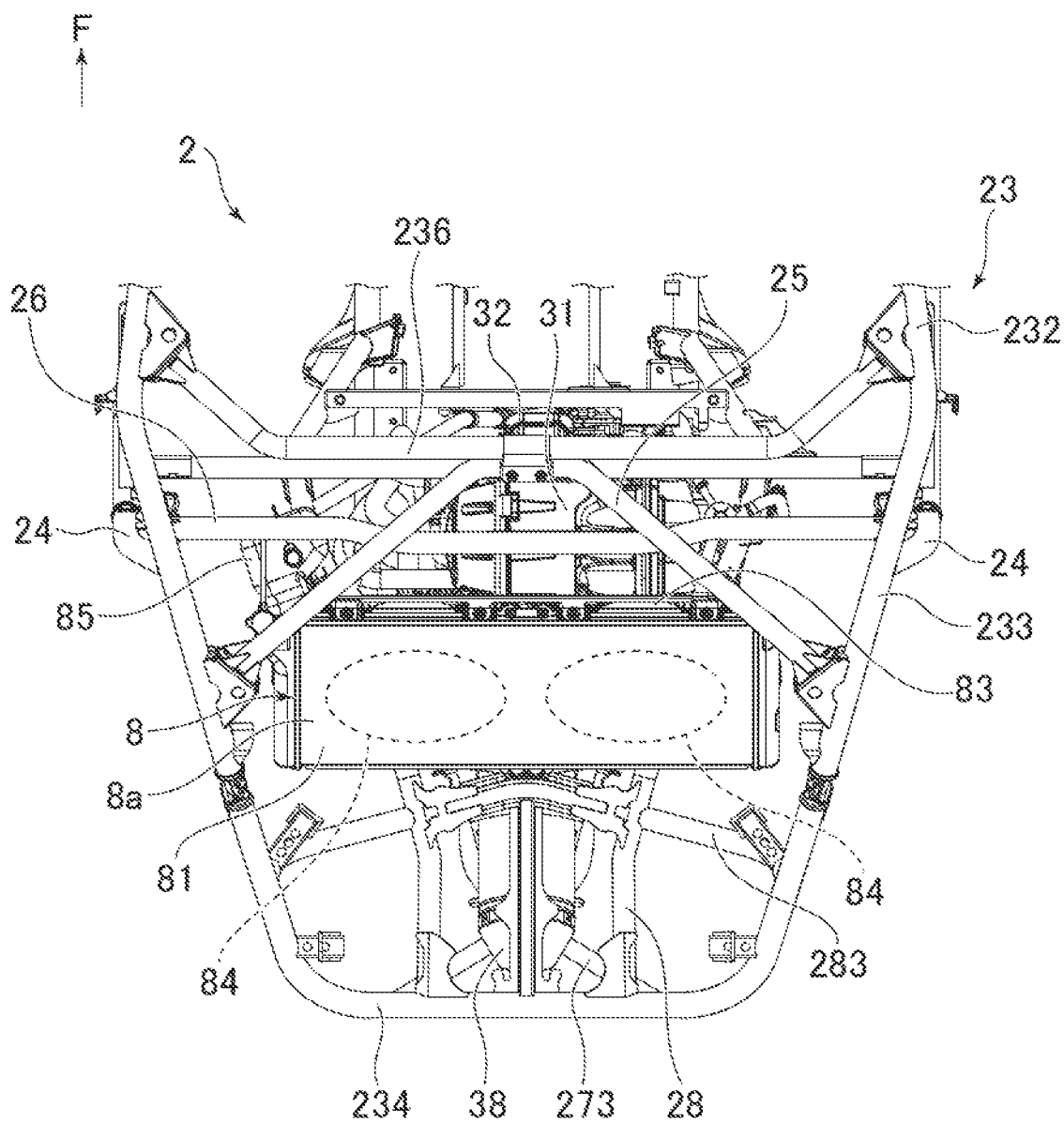
FIG. 7 is a plan view showing the rear part of the vehicle body frame of the vehicle shown in FIG. 1.
Figure 8:
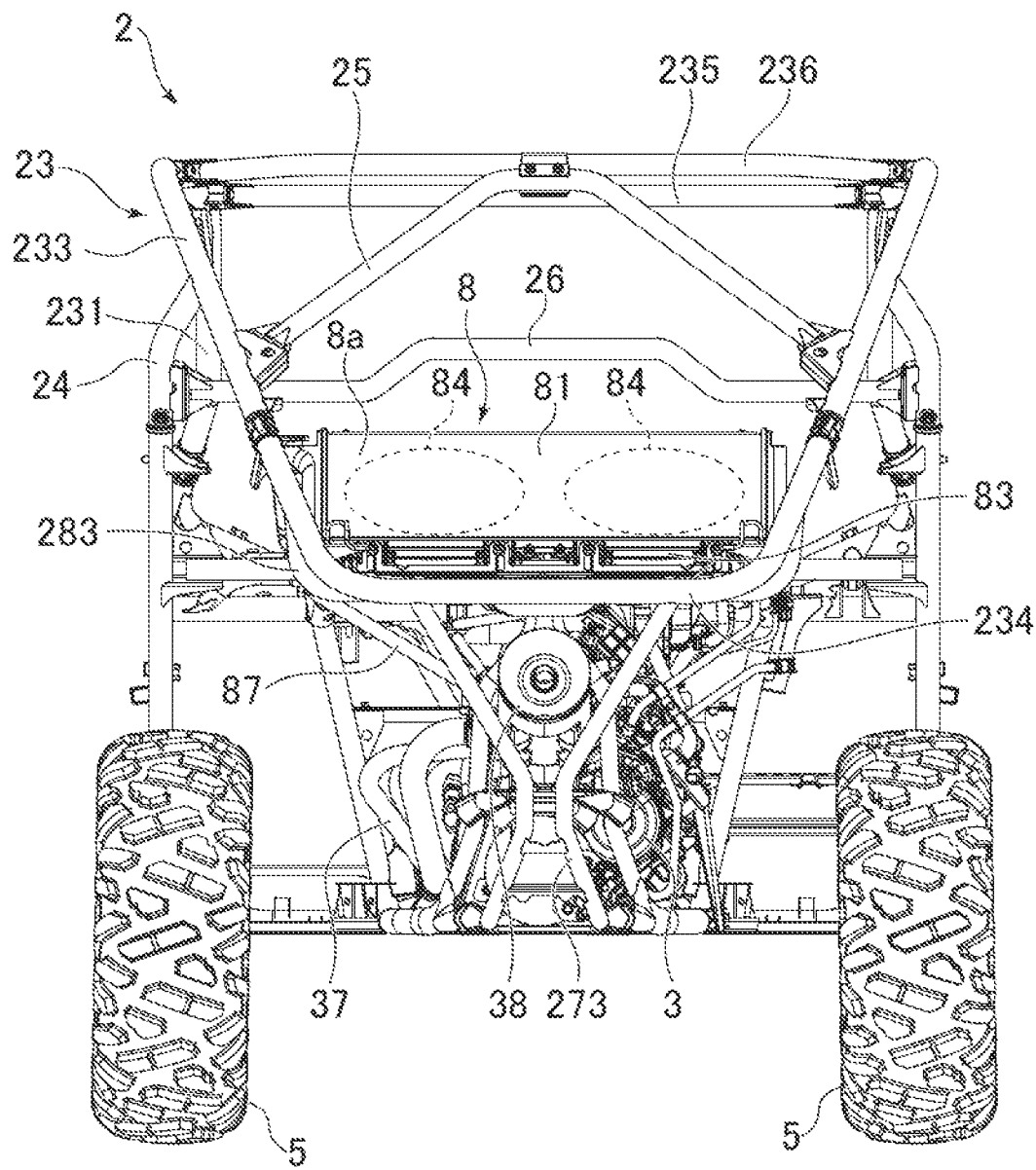
FIG. 8 is a rear view showing the rear part of the vehicle body frame of the vehicle shown in FIG. 1.
Figure 9:
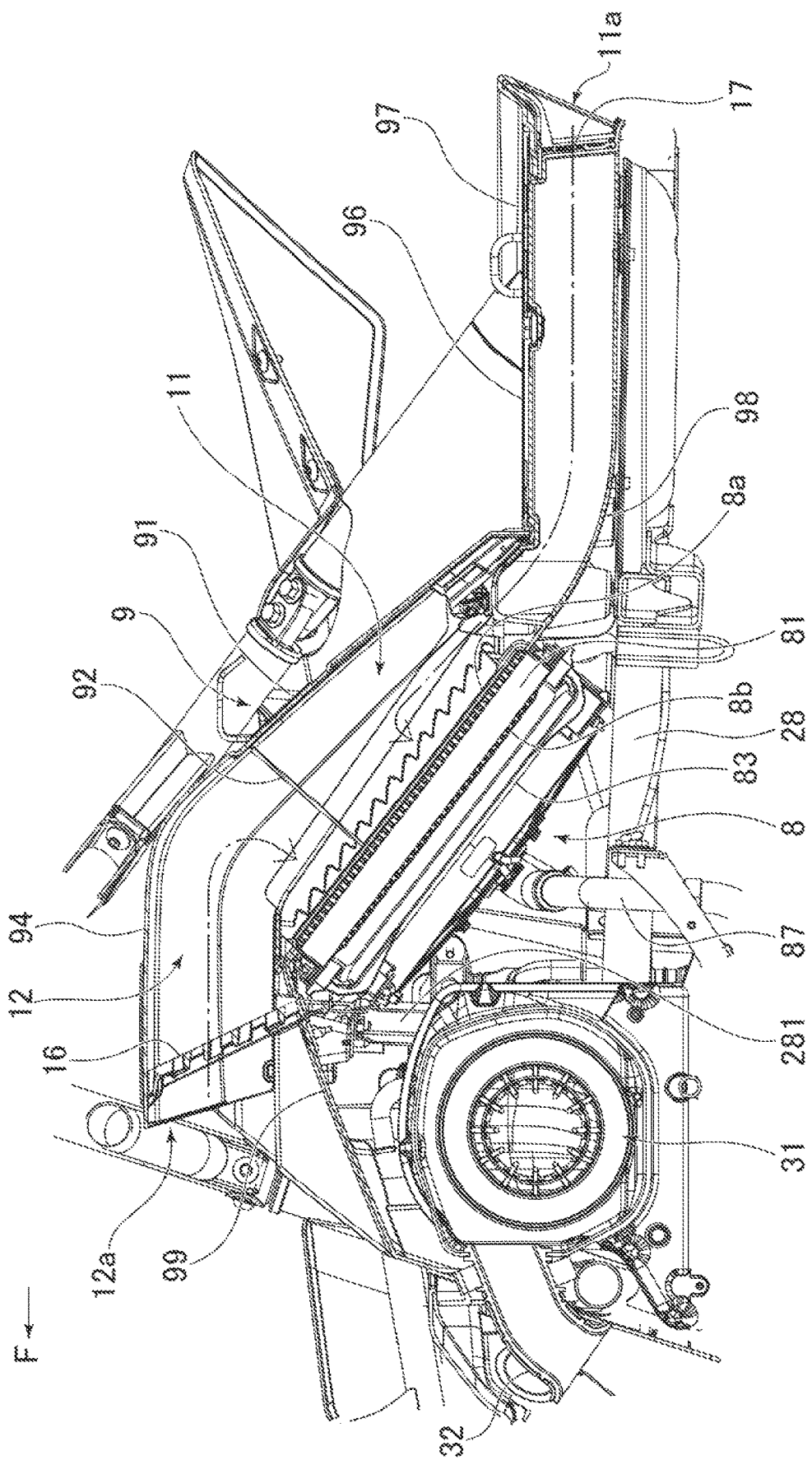
FIG. 9 is a sectional view cut along line IX-IX in FIG. 4.
Figure 10:
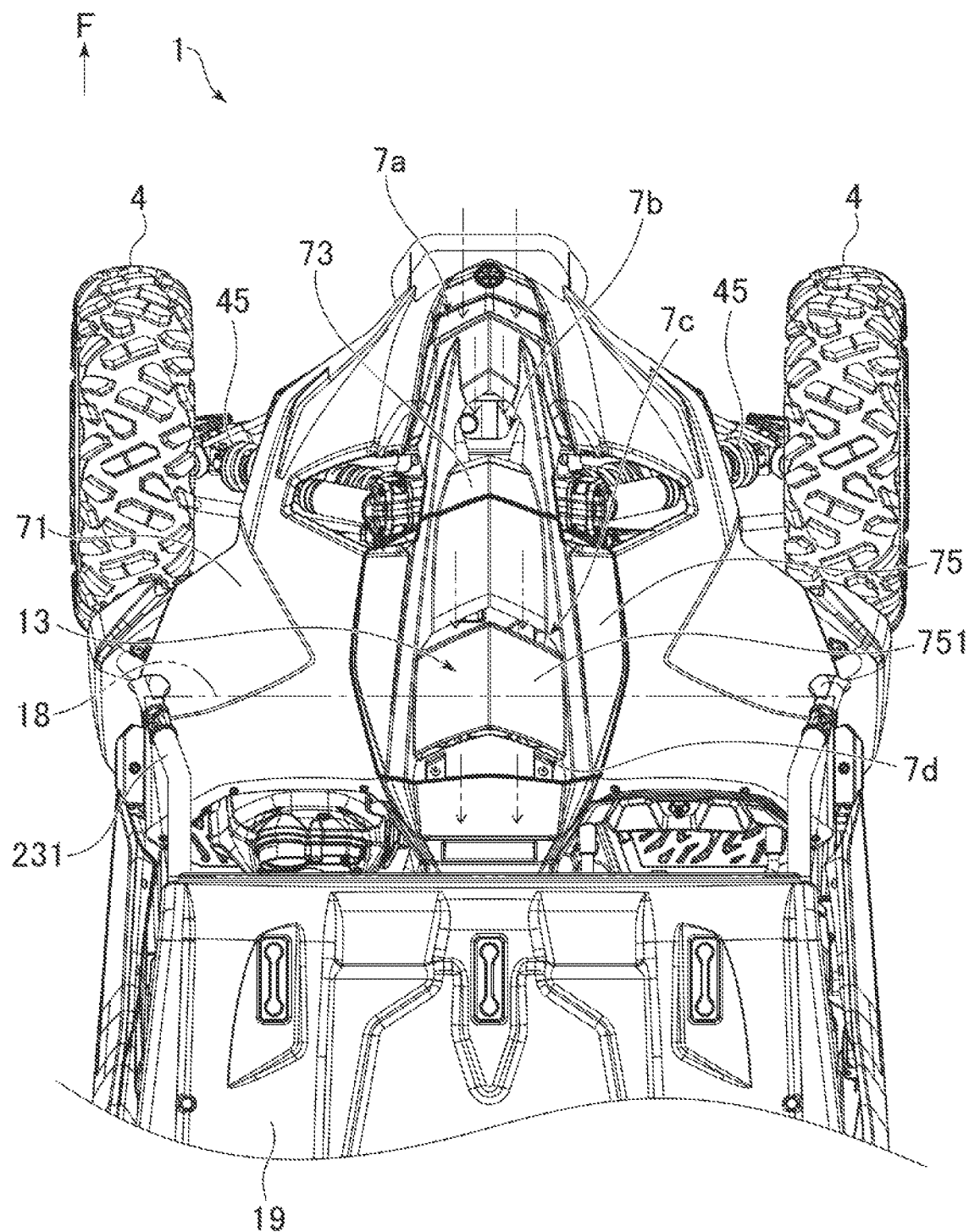
FIG. 10 is a plan view showing a front part of the vehicle.

FIGS. 1 to 5 illustrate a front view, left side view, plan view, rear view, and perspective view as seen from the left rear of a vehicle 1 according to one embodiment. Of the drawings, FIG. 3 does not show a roof 19 etc. FIGS. 6 to 8 are a left side view, plan view, and rear view showing a rear part of a vehicle body frame 2 on which an engine 3, a radiator 81, etc. are mounted. FIG. 9 is a sectional view cut along line IX-IX in FIG. 4. FIG. 10 is a plan view showing a front part of the vehicle 1.

In the embodiment, the vehicle 1 is e.g. a four-wheel vehicle including a plurality of seats 6A, 6B arranged in vehicle width directions and a steering wheel 65, called an ROV (Recreational Off highway Vehicle). The vehicle 1 is not limited to that, but may be e.g. a straddle-type four-wheel vehicle including a steering bar, called an ATV (all Terrain Vehicle).

In the following explanation, the forward direction, rearward direction, upward direction, downward direction, leftward direction, and rightward direction refer to the forward direction, rearward direction, upward direction, downward direction, leftward direction, and rightward direction seen from a passenger facing the steering wheel 65 and sitting on the seat 6A. The leftward and rightward directions are also referred to as vehicle width directions. An arrow F in the drawing indicates the forward direction.

The vehicle 1 includes a vehicle body frame 2 formed by e.g. iron or steel metal pipes. The seats 6A, 6B are supported by the vehicle body frame 2. The seats 6A, 6B are arranged in the leftward and rightward directions side by side. The seats 6A, 6B have seat parts 61 and back parts 63. The steering wheel 65 is positioned in front of the left seat 6A. The seats 6A, 6B are not limited to those in a single row, but may be arranged in a plurality of rows.

A pair of front wheels 4 apart from each other in the leftward and rightward directions are positioned in the front lower part of the vehicle 1, and a pair of rear wheels 5 apart from each other in the leftward and rightward directions are positioned in the rear lower part of the vehicle 1. The front wheels 4 and rear wheels 5 are suspended from the vehicle body frame 2, for example, by double wishbone suspensions.

The front wheels 4 are supported by upper arms 41 and lower arms 42 coupled to the front lower part of the vehicle body frame 2 swingably in the upward and downward directions (see FIG. 1). Suspensions 45 intervene between the front upper part of the vehicle body frame 2 and the upper arms 41. The suspensions 45 may be coupled to the lower arms 42.

Figure 4:
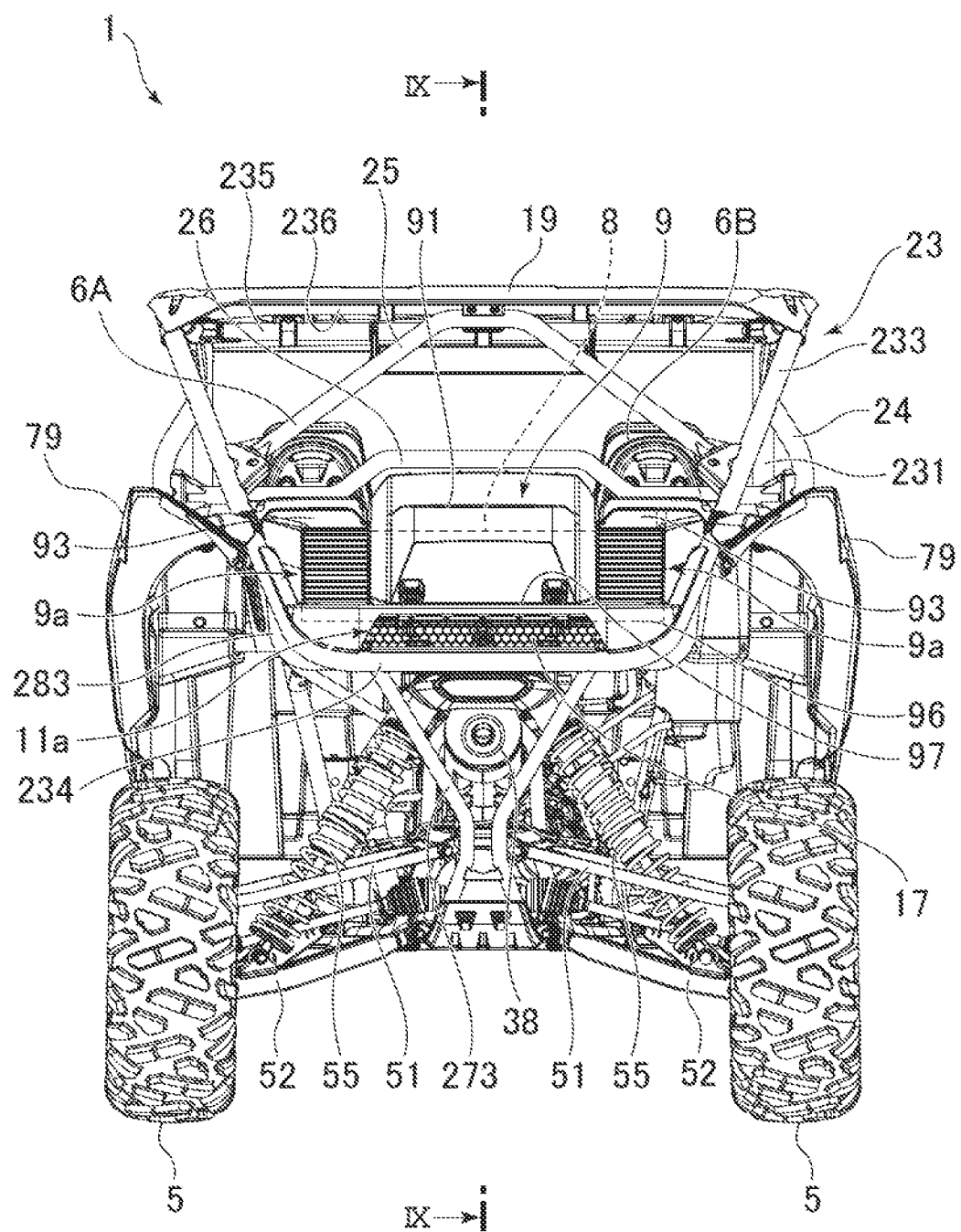
FIG. 4 is a rear view of the vehicle shown in FIG. 1.
Figure 5:
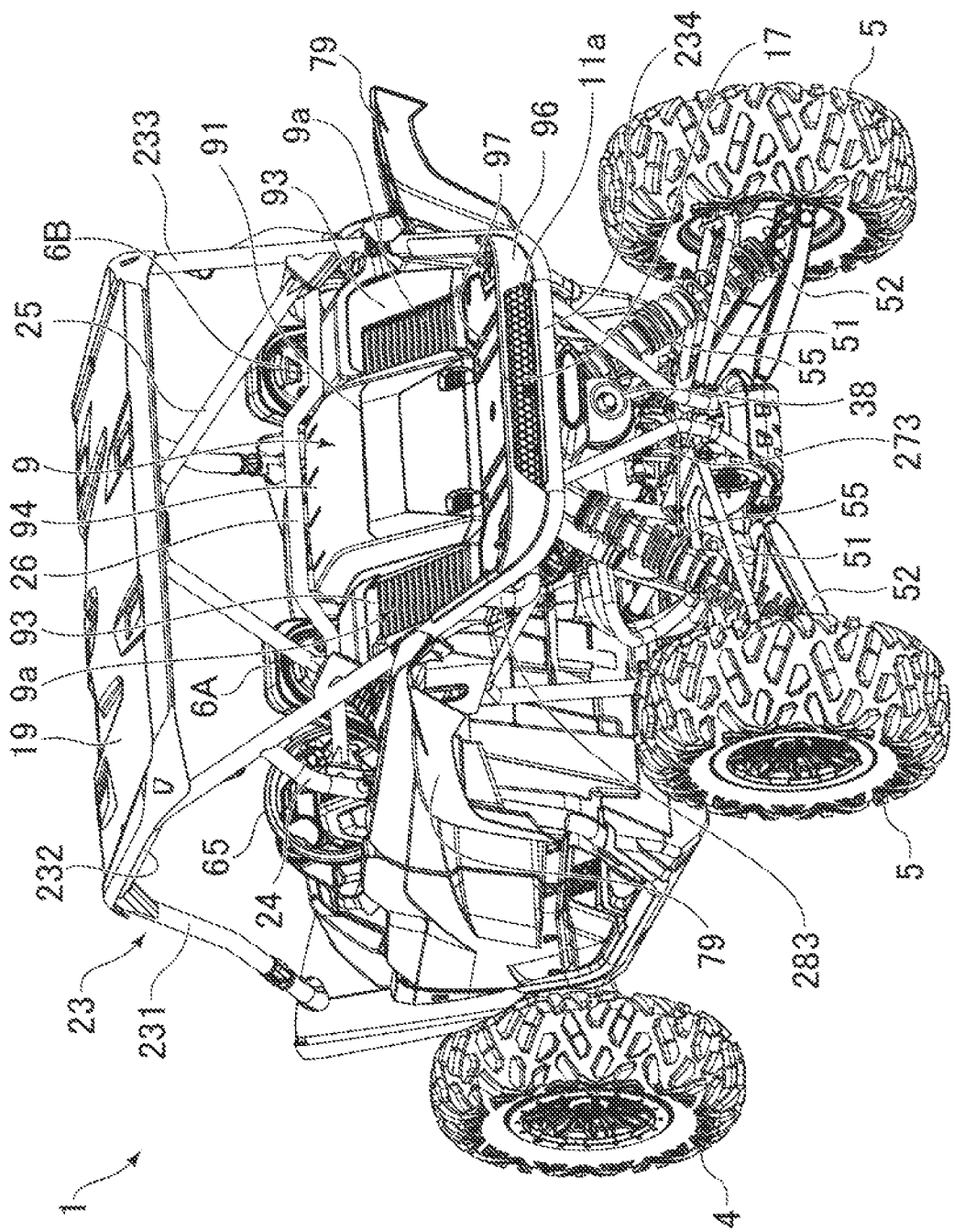
FIG. 5 is a perspective view of the vehicle shown in FIG. 1, as seen from the left rear.

The rear wheels 5 are supported by upper arms 51 and lower arms 52 coupled to the rear lower part of the vehicle body frame 2 swingably in the upward and downward directions (see FIG. 4). Suspensions 55 intervene between the rear upper part of the vehicle body frame 2 and the lower arms 52. The suspensions 55 may be coupled to the upper arms 51.

The vehicle 1 includes the engine 3 positioned in the rear of the seats 6A, 6B. The power output from the engine 3 is transmitted to the front wheels 4 and the rear wheels 5. The engine 3 is e.g. a water-cooled four-cycle parallel three-cylinder engine. The engine 3 is supported by the vehicle body frame 2 in an attitude in which the plurality of cylinders are arranged in the frontward and rearward directions and facing leftward and upward.

A plurality of exhaust pipes 37 are connected to the engine 3. The exhaust pipes 37 extend leftward from the engine 3 and bend rearward. A silencer 38 is connected to the rear ends of the exhaust pipes 37. The silencer 38 is placed in the rear of the engine 3 at the center in the leftward and rightward directions.

The vehicle 1 has a radiator unit 8 including the radiator 81 placed in the rear of the seats 6A, 6B. Further, the vehicle 1 has a cover 9 placed in the rear of the radiator unit 8. Furthermore, the vehicle 1 has a luggage carrier 96 placed in the rear of the cover 9. The details of the radiator unit 8, the cover 9, and the luggage carrier 96 are described below.

Figure 2:
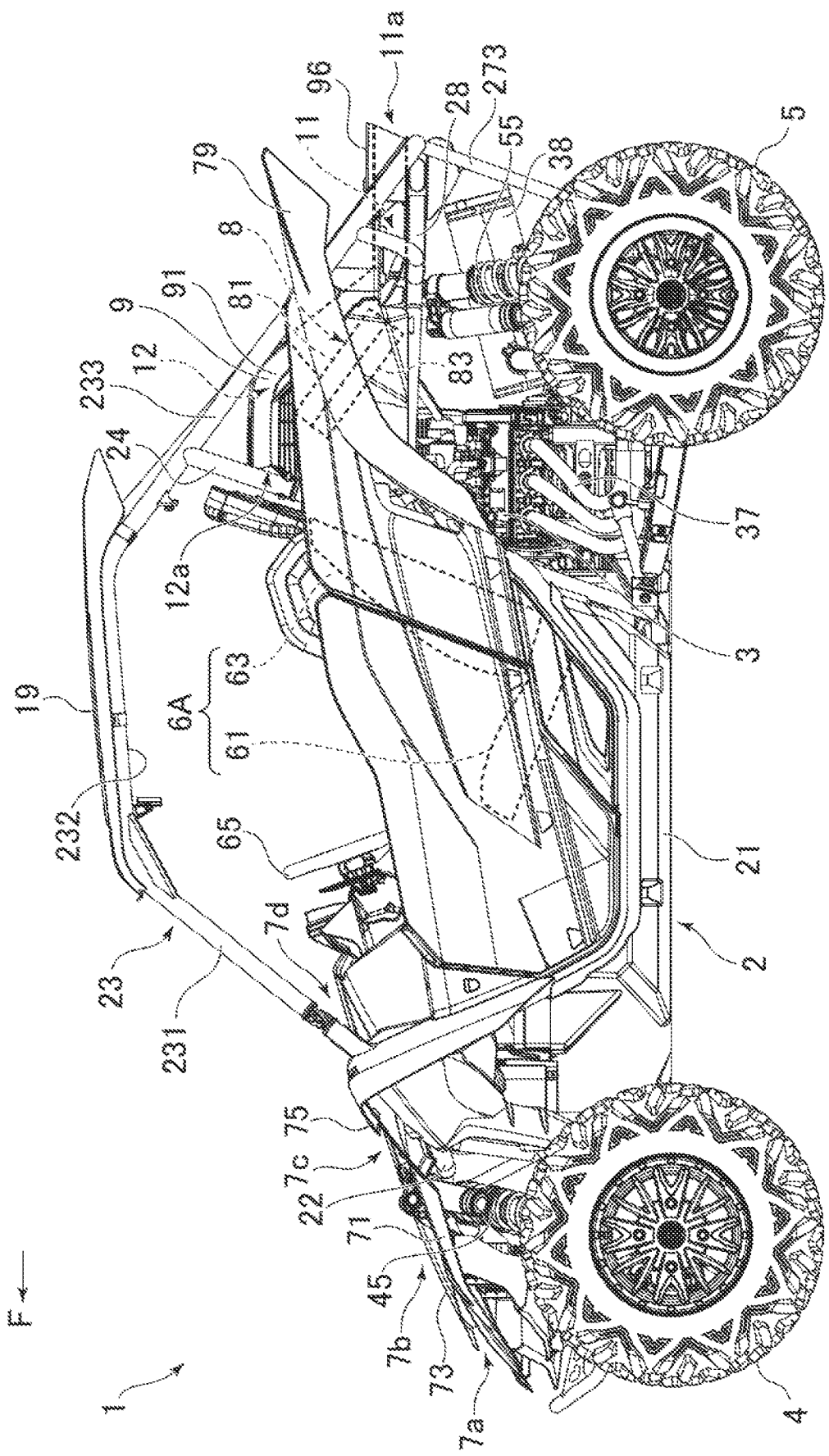
FIG. 2 is a left side view of the vehicle shown in FIG. 1.
Figure 3:
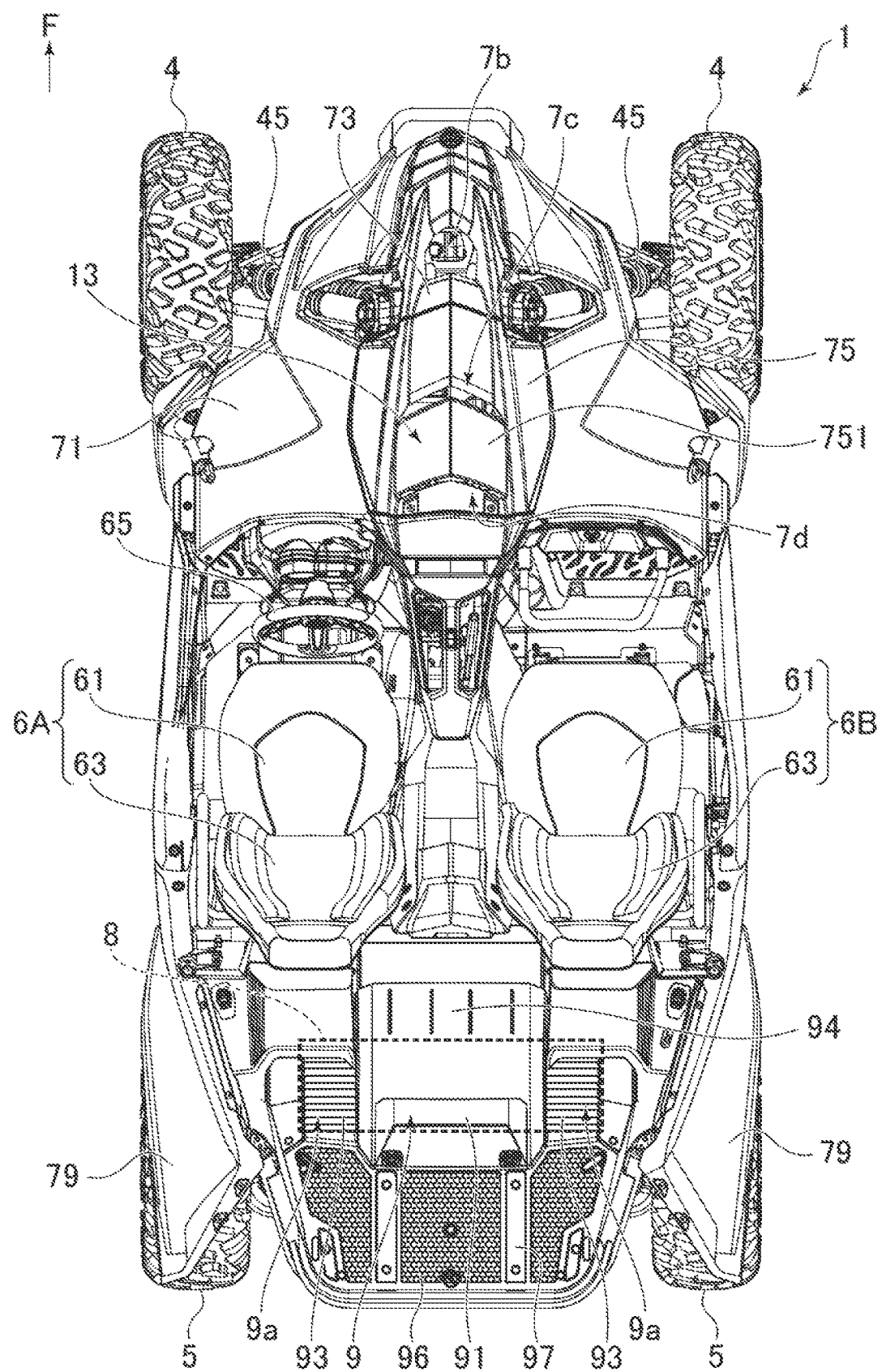
FIG. 3 is a plan view of the vehicle shown in FIG. 1.

As shown in FIG. 2, the vehicle body frame 2 has a main frame 21 extending in the forward and rearward directions in the lower part of the vehicle 1. A front frame 22 is coupled to the front part of the main frame 21. The upper arms 41, the lower arms 42, and the suspensions 45 that support the front wheels 4 are coupled to the front part of the main frame 21 and the front frame 22 (see FIG. 1). The front frame 22 is covered by a front panel 71. The details of the front panel 71 are described below.

Further, the vehicle body frame 2 has an upper frame 23 mainly extending in the forward and rearward directions in the upper part of the vehicle 1. The upper frame 23 is bent in an inverted V-shape so that the center part in the forward and rearward directions may project upward. The upper frame 23 includes pairs apart from each other in the leftward and rightward directions.

Specifically, the upper frame 23 has a pair of front frame portions 231 extending rearward and upward, a pair of middle frame portions 232 extending rearward from the upper ends of the front frame portions 231, a pair of rear frame portions 233 extending rearward and downward from the rear ends of the middle frame portions 232, and a rear end coupling portion 234 extending in the leftward and rightward directions between the rear ends of the rear frame portions 233. The distance between the rear frame portions 233 is gradually smaller toward the rear.

A wind shield 18 (see FIG. 10) may be provided in front of the front frame portions 231.

A plurality of cross members 235, 236 (see FIGS. 4 and 8) are provided between the middle frame portions 232. The roof 19 is placed on the middle frame portions 232 and the cross members 235, 236.

A pair of down frames 24 extending downward and nearly forward are coupled to the front upper parts of the rear frame portions 233. The down frames 24 are positioned in the rear of the seats 6A, 6B in the side view. A cross member 26 (see FIGS. 4 and 8) is located between the upper parts of the down frames 24.

In the middle of the rear frame portions 233, a cross member 25 (see FIGS. 4 and 8) bending in an inverted V-shape so that the center part in the leftward and rightward directions may project upward is provided. The center part and the upper end part of the cross member 25 in the leftward and rightward directions are fastened to the cross member 236 that supports the roof 19.

A rear frame 28 extending forward is coupled to the rear end coupling portion 234. The rear frame 28 includes pairs apart from each other in the leftward and rightward directions and coupled to the middle of the rear end coupling portion 234 (see FIG. 7).

Down frames 283 are coupled to the rear lower parts of the rear frame portions 233. The down frames 283 extend downward from the rear lower parts of the rear frame portions 233, bend inward in the leftward and rightward directions, and coupled to the rear end coupling portion 234.

Down frames 272, 273 extending downward are respectively coupled to the rear frame 28 and the rear end coupling portion 234. The lower ends of the down frames 272, 273 are coupled to the main frame 21. Beam portions 274 extending in the forward and rearward directions intervene between the down frames 272, 273. The upper arms 51, the lower arms 52, and the suspensions 55 supporting the rear wheels 5 are coupled to the rear frame 28, the down frames 273, and the beam portions 274 (see FIG. 4).

Figure 11:
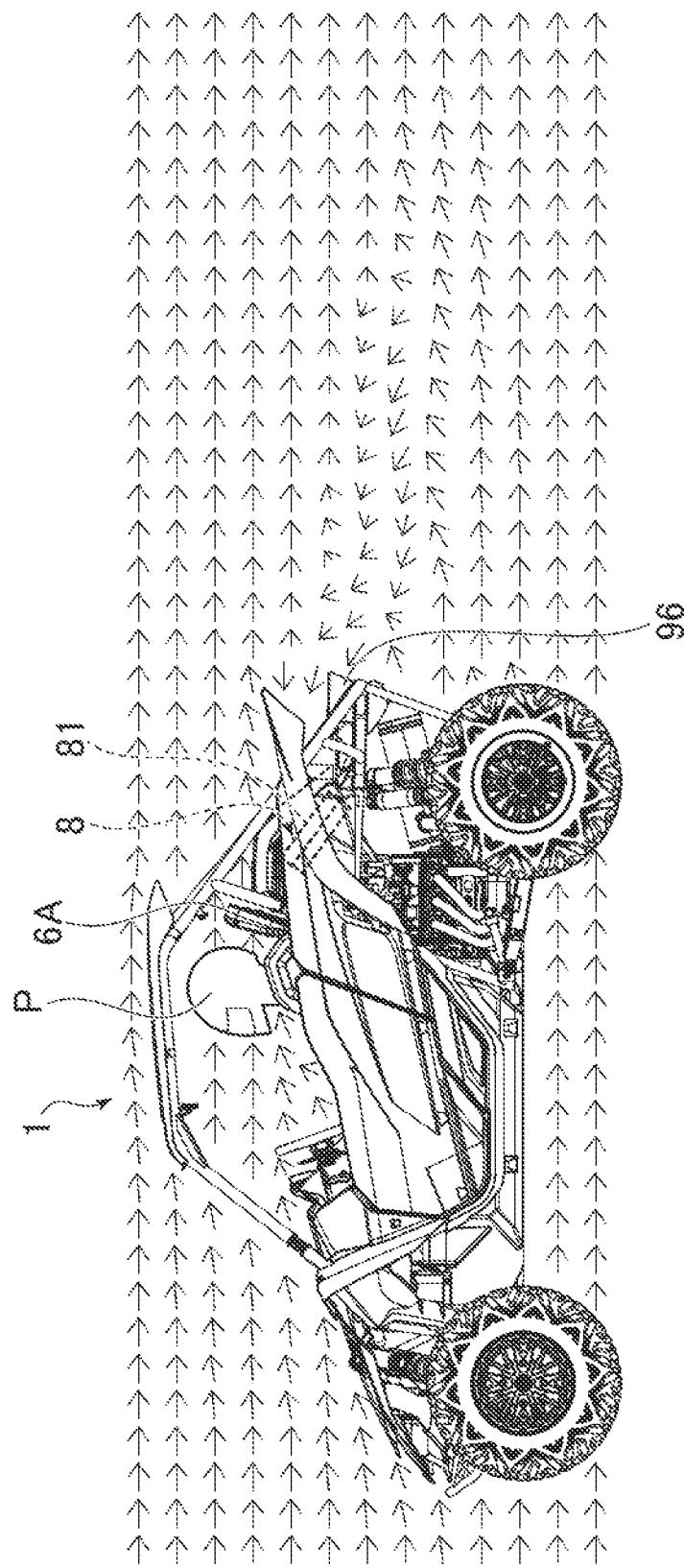
FIG. 11 illustrates one example of wind conditions around a vehicle without a wind shield.
Figure 12:
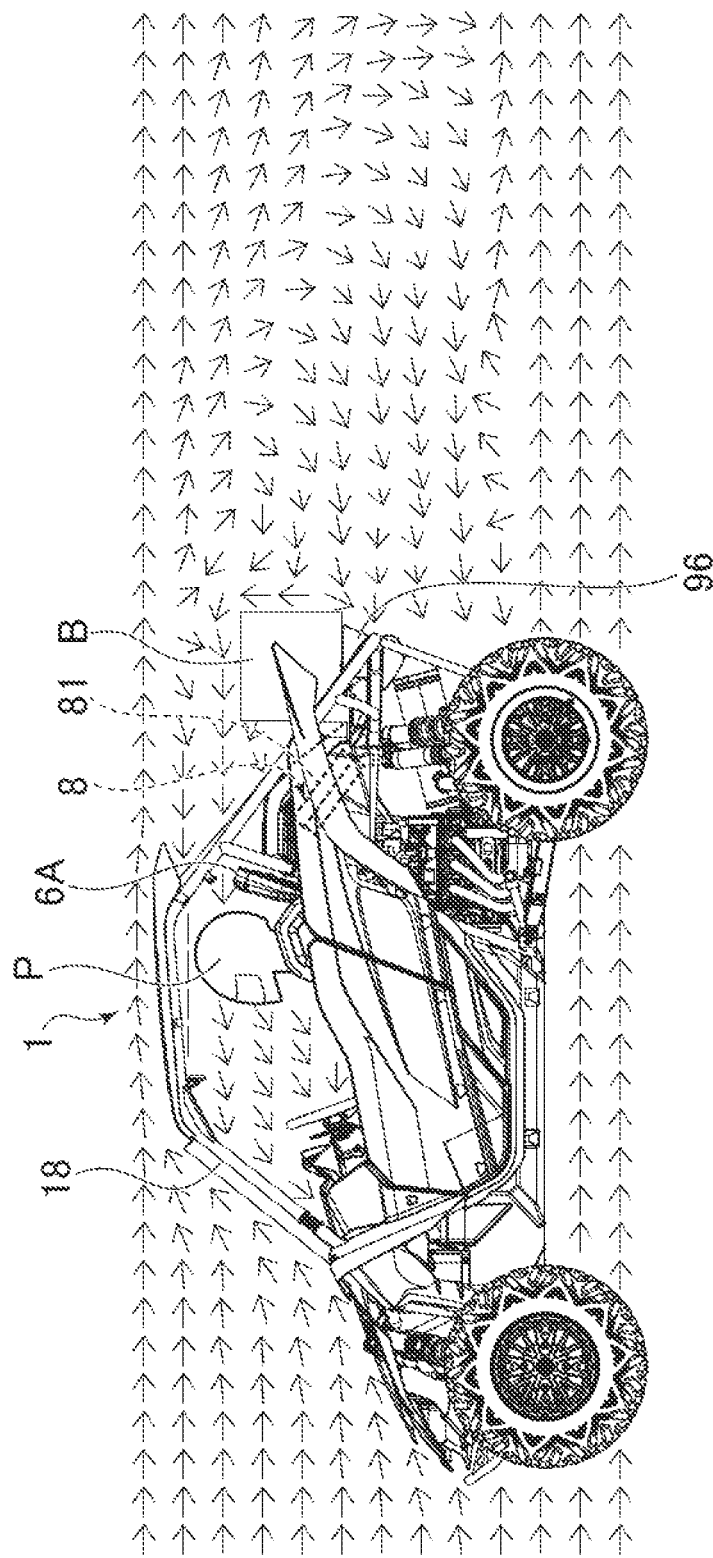
FIG. 12 illustrates one example of wind conditions around a vehicle with a wind shield and luggage mounted on a luggage carrier.

FIGS. 11 and 12 illustrate examples of wind conditions around the vehicle 1, when the vehicle 1 is traveling or moving. FIG. 11 shows the case without the wind shield 18, and FIG. 12 shows the case with the wind shield 18. Further, FIG. 12 also shows the case where luggage B is mounted on the luggage carrier 96.

As illustrated in FIGS. 11 and 12, in the case where the radiator 81 is placed in the rear of the seats 6A, 6B, the wind from the front may not necessarily cool the radiator 81 efficiently. Intake of the outside air using the wind from the front is hindered by a passenger P and the seats 6A, 6B. Further, in the case with the wind shield 18, the inside wind flows forward and the intake of the outside air using the wind from the front is impossible.

In this regard, the inventors have found that there is wind flowing from the rear to the front in the rear of the traveling vehicle 1, particularly, in the rear of the seats 6A, 6B. That is, for example, the wind swirls in the rear of the traveling vehicle 1 and the wind flowing from the rear to the front is generated.

As shown in FIG. 11, in the case without the wind shield 18, the wind flowing from the rear to the front is generated in a range narrower in the upward and downward directions in the rear of the seats 6A, 6B, particularly, around the luggage carrier 96. On the other hand, as shown in FIG. 12, in the case with the wind shield 18, the wind flowing from the rear to the front is generated in a range wider in the upward and downward directions in the rear of the vehicle 1.

Accordingly, in the embodiment, as shown in FIGS. 2, 6, and 9, a first outside air guide 11 having a first intake port 11a opening rearward and guiding the outside air taken in from the first intake port 11a to the radiator 81 is provided. Thereby, efficient cooling of the radiator 81 by taking the outside air using the wind flowing from the rear to the front is achieved.

Further, in the embodiment, a second outside air guide 12 having a second intake port 12a opening forward and guiding the outside air taken in from the second intake port 12a to the radiator 81 is provided. Thereby, cooling of the radiator 81 by taking the outside air also from the front is achieved. Particularly, in the case without the wind shield 18 (see FIG. 11), the outside air may be taken in using the wind flowing from the front to the rear.

The radiator unit 8 and configurations around the unit are described below.

As shown in FIGS. 2, 6, and 9, the radiator unit 8 includes the radiator (also referred to as "radiator core") 81 and fan unit 83. The radiator 81 and the fan unit 83 are respectively formed in plate shapes, and superimposed and integrally assembled. Further, the radiator unit 8 includes a reservoir tank 85 and a hose 87 connected to the engine 3.

The radiator 81 includes a fan placement surface 8b on which the fan unit 83 is positioned and an air inflow surface 8a opposite to the fan placement surface 8b. The fan placement surface 8b is a surface on the side on which the fan unit 83 is placed and opposed to fans 84 contained in the fan unit 83. The air inflow surface 8a is a surface on the side in which an air flows by spinning of the fans 84, where fins for heat dissipation are exposed (the fins are not shown in FIGS. 7 and 8).

The radiator 81 is positioned rear of the seats 6A, 6B. Specifically, the radiator 81 is positioned above the seat surfaces of the seat parts 61 in the rear of the back parts 63. Further, the radiator 81 is positioned below the upper ends of the back parts 63. Further, the radiator 81 is positioned below the upper end of the steering wheel 65 in the rear of the steering wheel 65.

The radiator 81 is positioned above the engine 3 and above the silencer 38. Further, the radiator 81 is positioned above the upper ends of the suspensions 55. Furthermore, the radiator 81 is positioned rear of an air cleaner 31.

The air cleaner 31 is formed in a cylindrical shape and positioned rear of the seats 6A, 6B, in front of the radiator 81, and above the engine 3 in a lying position so that the axis direction may be along the leftward and rightward directions (see FIGS. 6 and 7). The air cleaner 31 includes an inlet port 32 projecting forward. The reservoir tank 85 of the radiator unit 8 is positioned on the left of the air cleaner 31.

The radiator 81 is positioned so that the air inflow surface 8a may face at least rearward. In the embodiment, the air inflow surface 8a faces rearward and upward. That is, the radiator 81 is positioned to be inclined so that the air inflow surface 8a may face rearward and upward and the fan placement surface 8b may face forward and downward. For example, the air inflow surface 8a is inclined at an angle of about 30 to 50 degrees relative to the horizontal plane. The fan placement surface 8b faces in the direction of the engine 3 so that the air emitted from the fan unit 83 may contact the engine 3 and the exhaust pipes 37. Note that "the air inflow surface 8a faces rearward" refers to a state in which the air inflow surface 8a can be visually recognized when the cover 9 etc. are detached and the radiator unit 8 is seen from the rear of the vehicle. Therefore, the air inflow surface 8a may be inclined in the leftward and rightward directions to face leftward and rearward or rightward and rearward.

The radiator 81 is positioned on the rear frame 28. Specifically, the radiator 81 is supported in the tilted position with the fan unit 83 by a bracket 281 (see FIGS. 6 and 9) extending upward from the rear frame 28. At least one of the radiator 81 and the fan unit 83 may overlap with the rear end part of the air cleaner 31 (see FIGS. 7 and 9) in a plane view.

The air inflow surface 8a of the radiator 81 extends in the leftward and rightward directions and has a rectangular shape in a longitudinal direction along the leftward and rightward directions. The length of the radiator 81 in the leftward and rightward directions is larger than that of the engine 3, and both ends of the radiator 81 in the leftward and rightward directions are respectively located on the outer side than the engine 3 in the leftward and rightward directions. Further, the left end of the radiator 81 is positioned on the left of the exhaust pipes 37. The fan unit 83 includes the two fans 84 placed side by side in the leftward and rightward directions. The two fans 84 are respectively opposed to the left half area and the right half area of the fan placement surface 8b.

The cover 9 is arranged to be opposed to the air inflow surface 8a of the radiator 81. Accordingly, similar to the air inflow surface 8a, the outer surface of the cover 9 faces rearward and upward. The cover 9 has a guide forming portion 91 provided in the center part in the leftward and rightward directions and left and right side portions 93 provided on both the left and right sides of the guide forming portion 91. The guide forming portion 91 is opposed to the center part of the air inflow surface 8a in the leftward and rightward directions, and the left and right side portions 93 are opposed to the left and right side parts with the center part of the air inflow surface 8a in between.

The guide forming portion 91 is farther from the air inflow surface 8a than the left and right side portions 93 and convex rearward and upward. That is, the distance between the guide forming portion 91 and the air inflow surface 8a is larger than the distance between the left and right side portions 93 and the air inflow surface 8a. A partition wall 92 (see FIGS. 6 and 9) extending toward the air inflow surface 8a and spreading in the leftward and rightward directions is positioned on the inner surface of the guide forming portion 91.

A plurality of slits 9a are formed in the left and right side portions 93. The plurality of slits 9a extend in the leftward and rightward directions and are arranged in the orthogonal directions. The slits 9a take in the wind flowing from the rear to the front and supply the wind to the left and right side parts of the air inflow surface 8a. If luggage is mounted on the luggage carrier 96, the wind flowing from the rear to the front flows through both sides of the luggage and reaches the side portions 93 of the cover 9, and thereby, the wind can be taken in from the slits 9a regardless whether the luggage is mounted on the luggage carrier 96.

The cover 9 includes an upper wall portion 94 extending forward from the front upper end of the guide forming portion 91. A lower wall member 99 is provided below the front part of the upper wall portion 94. The lower wall member 99 extends frontward and downward from the vicinity of the front upper end of the air inflow surface 8a. The lower wall member 99 is attached to the bracket 281 together with the radiator 81.

The luggage carrier 96 is placed in the rear of the cover 9. The upper surface of the luggage carrier 96 is a luggage mount surface 97 on which luggage is mounted. The luggage carrier 96 extends rearward from the rear lower end part of the cover 9 and spreads in the leftward and rightward directions. The luggage carrier 96 has a nearly trapezoidal shape with the rear side shorter than the front side. The luggage carrier 96 is placed above the silencer 38 and above the rear frame 28. The cover 9 and the luggage carrier 96 are attached to the rear frame portions 233 of the upper frame 23. The cover 9 or luggage carrier 96 may be integrally formed with a fender 79 provided above the rear wheels 5.

A bottom member 98 (see FIGS. 6 and 9) opposed to the lower surface of the luggage carrier 96 is positioned below the luggage carrier 96. The front part of the bottom member 98 is curved forward and upward and reaches the vicinity of the rear lower end of the air inflow surface 8a. The bottom member 98 is positioned above the silencer 38 and above the rear frame 28. The bottom member 98 is attached to the rear frame 28.

The first outside air guide 11 is formed by a part of the guide forming portion 91 on the rear downside of the partition wall 92, the luggage carrier 96, and the bottom member 98. The first outside air guide 11 extends rearward from the air inflow surface 8a, and the first intake port 11a is provided in the rear end part thereof. Specifically, the first outside air guide 11 extends rearward and downward from the position of the partition wall 92, bends, and extends rearward. The ceiling portion of the rear part of the first outside air guide 11 is formed by the luggage carrier 96, and the first outside air guide 11 is formed below the luggage mount surface 97 of the luggage carrier 96.

The first intake port 11a is formed by the rear end part of the luggage carrier 96 and the rear end part of the bottom member 98. Accordingly, the first intake port 11a is located in the rear end part of the entire vehicle body. The height of the luggage carrier 96 is equal to or lower than the rear lower end of the air inflow surface 8a and the first intake port 11a is located below the air inflow surface 8a. A mesh 17 for preventing entry of foreign matter (debris) is provided in the first intake port 11a. The outside air taken in from the first intake port 11a flows forward between the luggage carrier 96 and the bottom member 98, and then, flows forward and upward along the guide forming portion 91 and reaches the first area of the air inflow surface 8a (the area on the rear downside of the partition wall 92).

The second outside air guide 12 is formed by a part of the guide forming portion 91 on the front upside of the partition wall 92, the partition wall 92, the upper wall portion 94, and the lower wall member 99. The second outside air guide 12 extends forward from the air inflow surface 8a, and the second intake port 12a is provided in the front end part thereof. Specifically, the second outside air guide 12 extends forward and upward from the position of the partition wall 92, bends, and extends forward.

The second intake port 12a is formed by the front end part of the upper wall portion 94 and located above the air inflow surface 8a. A mesh 16 for preventing entry of foreign matter is provided in the second intake port 12a. The outside air taken in from the second intake port 12a is changed in direction downward by the guide forming portion 91 and the partition wall 92, and reaches the second area of the air inflow surface 8a (the area on the front upside of the partition wall 92).

Of the air inflow surface 8a, the first area to which the outside air is guided by the first outside air guide 11 is larger than the second area to which the outside air is guided by the second outside air guide 12. The flow rate of the outside air taken in from the rear is smaller than the flow rate of the outside air taken in from the front and the first area is made larger than the second area, and thereby, the difference between the flow rate at which the outside air passes through the first area and the flow rate at which the outside air passes through the second area is suppressed.

The second intake port 12a is positioned between the seats 6A, 6B in the front view (see FIG. 1). The second intake port 12a is positioned below the upper ends of the seats 6A, 6B. Further, the cross member 26 positioned between the down frames 24 has the center part in leftward and rightward directions bending to project upward with respect to the side parts for avoiding the upper wall portion 94 forming the second intake port 12a.

In the above described embodiment, the air inflow surface 8a of the radiator 81 faces rearward and upward, however, the direction in which the air inflow surface 8a faces is not limited to that. For example, the air inflow surface 8a may be made horizontal so that the outside air taken in from the rear and the outside air taken in from the front may be respectively guided to the air inflow surface 8a. Or, the air inflow surface 8a may face right rearward or rearward and downward so that the outside air taken in from the rear may be guided to the air inflow surface 8a.

Further, in the above described embodiment, the air inflow surface 8a of the radiator 81 extends in the leftward and rightward directions, however, the shape of the air inflow surface 8a is not limited to that. For example, the radiator 81 may be divided or bent into left and right parts and the left half of the air inflow surface 8a may face leftward and rearward and the right half may face rightward and rearward, or the left half of the air inflow surface 8a may face rightward and rearward and the right half may face leftward and rearward.

As shown in FIGS. 1, 2, and 10, two covers 73, 75 are attached onto the front panel 71. The covers 73, 75 are attached adjacently in the forward and rearward directions on the center part of the front panel 71 in the leftward and rightward directions.

Two intake ports 7a, 7b are formed in the front cover 73. The front intake port 7a opens forward (see FIG. 1). The rear intake port 7b is located on the rear upside of the front intake port 7a and opens forward and upward (see FIGS. 1 and 10). The intake ports 7a, 7b take in the wind from the front to the rear of the cover 73.

An intake port 7c and an emission port 7d are formed in the rear cover 75. The intake port 7c opens forward (see FIGS. 1 and 10). The emission port 7d is positioned rear of the intake port 7c and opens rearward (see FIG. 10).

A guide forming portion 751 opposed to the front panel 7 with a gap in between is positioned between the intake port 7c and the emission port 7d of the cover 75, and the front panel 7 and the guide forming portion 751 form a third outside air guide 13. The wind taken in from the intake ports 7a to 7c passes through the third outside air guide 13 and is emitted to the rear from the emission port 7d.

The intake ports 7a to 7c are positioned in the front of the wind shield 18, and the emission port 7d is positioned in the rear of the wind shield 18. Accordingly, even in the case of the vehicle 1 having the wind shield 18, the wind from the front is fed to the rear of the wind shield 18 through the third outside air guide 13.

The wind fed to the rear of the wind shield 18 through the third outside air guide 13 passes between the seats 6A, 6B and is taken from the second intake port 12a into the second outside air guide 12 and used for cooling of the radiator 81. That is, even in the case of the vehicle 1 having with the wind shield 18, the second outside air guide 12 may take in the outside air using the wind flowing from the front to the rear.

In the above described embodiment, the radiator 81 positioned in the rear of the seats 6A, 6B and having the air inflow surface 8a at least facing rearward and the first outside air guide 11 having the first intake port 11a opening rearward and guiding the taken in outside air to the air inflow surface 8a are provided, and thereby, the outside air may be taken in using the wind flowing from the rear to the front to efficiently cool the radiator 81.

In the embodiment, the second outside air guide 12 having the second intake port 12a opening forward and guiding the taken in outside air to the air inflow surface 8a are provided, and thereby, the radiator 81 may be also cooled using the outside air taken in from the front. Particularly, in the case of the vehicle 1 without the wind shield 18, the outside air may be taken in using the wind flowing from the front to the rear.

In the embodiment, the first intake port 11a is positioned below the air inflow surface 8a, and the space in the rear of the radiator 81 may be used as a space for luggage. Further, the luggage carrier 96 may be provided in a position not too high.

In the embodiment, the first intake port 11a is positioned in the rear of the air inflow surface 8a, and thereby, the outside air taken in from the rear may be guided directly to the air inflow surface 8a in the flow not bended largely.

In the embodiment, the first intake port 11a is positioned in the rear end part of the vehicle body, and thereby, the wind from the rear to the front at a relatively large flow rate can be taken in. Further, the wind flowing from the rear to the front may be taken in regardless whether luggage is on the luggage carrier 96.

In the embodiment, the first outside air guide 11 is formed below the luggage mount surface 97 of the luggage carrier 96, and thereby, the wind flowing from the rear to the front may be taken in regardless whether luggage is on the luggage carrier 96.

In the embodiment, a part of the first outside air guide 11 is formed by the luggage carrier 96. That is, the first outside air guide 11 is formed using the luggage carrier 96.

In the embodiment, the first intake port 11a is positioned in the rear end part of the luggage carrier 96, and thereby, the wind from the rear to the front at a relatively large flow rate can be taken in. Further, the wind flowing from the rear to the front may be taken in regardless whether luggage is on the luggage carrier 96.

In the embodiment, the partition wall 92 is positioned between the first outside air guide 11 and the second outside air guide 12, and thereby, a collision between the outside air taken in from the rear and the outside air taken in from the front may be prevented.

In the embodiment, of the air inflow surface 8a, the first area to which the outside air is guided by the first outside air guide 11 is larger than the second area to which the outside air is guided by the second outside air guide 12, and thereby, the difference between the flow rate at which the outside air taken in from the rear passes through the first area and the rate at which the outside air taken in from the front passes through the second area may be suppressed.

In the embodiment, the second intake port 12a is positioned between the seats 6A, 6B in the front view, and thereby, the wind flowing from the front to the rear may be efficiently taken in without hinderance by the passenger and the seats 6A, 6B.

In the embodiment, the air inflow surface 8a faces rearward and upward, and thereby, accumulation of foreign matter such as pebbles on the air inflow surface 8a may be suppressed and both the outside air taken in from the rear and the outside air taken in from the front may be easily hit to the air inflow surface 8a.

In the embodiment, the radiator 81 is formed in the plate shape and placed to be inclined so that the air inflow surface 8a may face rearward and upward and the fan placement surface 8b may face forward and downward, and thereby, accumulation of foreign matter such as pebbles on the air inflow surface 8a may be suppressed and the length in the forward and backward directions may be suppressed.

In the embodiment, the air inflow surface 8a extends in the vehicle width direction, and thereby, the outside air taken in from the rear may be contact the air inflow surface at an angle closer to the right angle and the length in the forward and backward directions may be suppressed.

In the embodiment, the radiator 81 is positioned between the seats 6A, 6B and the luggage carrier 96. That is, the radiator 81 may be positioned using the space between the seats 6A, 6B and the luggage carrier 96.

In the embodiment, the cover 9 positioned to oppose to the air inflow surface 8a is provided, and thereby, the radiator 81 can be protected. Further, changes of the direction of the wind around the air inflow surface 8a depending on the presence of the wind shield 18 may be suppressed.

In the embodiment, the slits 9a are formed in the left and right side portions 93 of the cover 9, and thereby, the radiator 81 may be also cooled by the outside air taken in from the slits 9a.

In the embodiment, the fan placement surface 8b faces in the direction of the engine 3, and thereby, the wind emitted from the radiator 81 may be used for cooling of the exhaust pipes 37 etc. connected to the engine 3.

In the embodiment, even in the case with the wind shield 18 in the front of the seats 6A, 6B, the outside air may be taken in using the wind from the rear to the front to cool the radiator 81.

In the embodiment, the third outside air guide 13 having the intake ports 7a to 7c in the front of the wind shield 18 and having the emission port 7d in the rear of the wind shield 18 is provided, and thereby, even in the case with the wind shield 18, the outside air taken in and emitted by the third outside air guide 13 may be taken in by the second outside air guide 12.

In the embodiment, the third outside air guide 13 is formed by the front panel 7 and the cover 75. That is, the third outside air guide 13 is formed using the front panel 7 and the cover 75.

In the embodiment, the first outside air guide 11 having the first intake port 11a opening rearward and guiding the taken in outside air to the air inflow surface 8a and the second outside air guide 12 having the second intake port 12a opening forward and guiding the taken in outside air to the air inflow surface 8a are provided, and thereby, the radiator 81 may be efficiently cooled by both the outside air taken in from the rear and the outside air taken in from the front.

As above, the embodiments of the invention are explained, however, the invention is not limited to the above described embodiments, but obviously, various modifications may be made by a person skilled in the art.

What is claimed is:
1. A vehicle comprising:
  a vehicle body frame;
  a seat supported by the vehicle body frame;
  a radiator positioned behind the seat and above a seat surface of the seat, the radiator comprising a fan placement surface on which a fan is provided and an air inflow surface opposite to the fan placement surface, the air inflow surface facing at least rearward; and
  a first outside air guide comprising a first intake port opening rearward, the first outside air guide configured to guide outside air taken in from the first intake port to the air inflow surface.
2. The vehicle according to claim 1, further comprising:
  a second outside air guide comprising a second intake port opening forward, the second outside air guide configured to guide the outside air taken in from the second intake port to the air inflow surface.

3. The vehicle according to claim 1, wherein the first intake port is positioned below the air inflow surface.

4. The vehicle according to claim 1, wherein the first intake port is positioned to the rear of the air inflow surface.

5. The vehicle according to claim 1, wherein the first intake port is positioned in a rear end part of a vehicle body.

6. The vehicle according to claim 1, further comprising:
a luggage carrier provided in the rear of the seat,
wherein the first outside air guide is formed below a luggage mount surface of the luggage carrier.

7. The vehicle according to claim 6, wherein a portion of the first outside air guide is formed by the luggage carrier.

8. The vehicle according to claim 6, wherein the first intake port is positioned in a rear end part of the luggage carrier.

9. The vehicle according to claim 2, further comprising:
a partition wall positioned between the first outside air guide and the second outside air guide.

10. The vehicle according to claim 2, wherein, of the air inflow surface, a first area to which the outside air is guided by the first outside air guide is larger than a second area to which the outside air is guided by the second outside air guide.

11. The vehicle according to claim 2, wherein
the seat is a plurality of seats positioned side-by-side in vehicle width directions, and
the second intake port is positioned between the plurality of seats in a front view.

12. The vehicle according to claim 1, wherein the air inflow surface faces rearward and upward.

13. The vehicle according to claim 1, wherein the radiator is formed in a plate shape and positioned to be inclined so that the air inflow surface faces rearward and upward and the fan placement surface faces forward and downward.

14. The vehicle according to claim 1, wherein the air inflow surface extends in vehicle width directions.

15. The vehicle according to claim 1, further comprising:
a luggage carrier positioned in the rear of the seat,
wherein the radiator is positioned between the seat and the luggage carrier.

16. The vehicle according to claim 1, further comprising:
a cover,
wherein the cover is arranged in a position opposing the air inflow surface.

17. The vehicle according to claim 16, wherein a plurality of slits are formed on each side of the cover in the vehicle width direction.

18. The vehicle according to claim 1, further comprising:
an engine positioned in the rear of the seat,
wherein the fan placement surface faces in a direction of the engine.

19. The vehicle according to claim 1, further comprising:
a wind shield positioned in the front of the seat.

20. The vehicle according to claim 2, further comprising:
a wind shield positioned in the front of the seat; and
a third outside air guide comprising a third intake port in the front of the wind shield and having an emission port of the outside air taken in from the third intake port in the rear of the wind shield.

21. The vehicle according to claim 20, further comprising:
a front panel configured to cover a front part of the vehicle body frame; and
a cover attached to the front panel,
wherein the third outside air guide is formed by the front panel and the cover.

22. A vehicle comprising:
a vehicle body frame;
a seat supported by the vehicle body frame;
a radiator positioned behind the seat and above a seat surface of the seat, the radiator comprising a fan placement surface on which a fan is positioned and an air inflow surface opposite to the fan placement surface;
a first outside air guide comprising a first intake port opening rearward, the first outside air guide configured to guide outside air taken in from the first intake port to the air inflow surface; and
a second outside air guide comprising a second intake port opening forward, the second outside air guide configured to guide the outside air taken in from the second intake port to the air inflow surface.

* * * * *